US005793497A

United States Patent [19]
Funk

[11] Patent Number: 5,793,497
[45] Date of Patent: Aug. 11, 1998

[54] METHOD AND APPARATUS FOR DELIVERING AND MODIFYING INFORMATION ELECTRONICALLY

[75] Inventor: John T. Funk, Arlington, Va.

[73] Assignee: Infobeat, Inc., Denver, Colo.

[21] Appl. No.: 431,254

[22] Filed: Apr. 6, 1995

[51] Int. Cl.⁶ .................................................. H04N 1/21
[52] U.S. Cl. ........................ 358/402; 358/403; 358/406
[58] Field of Search ................................ 358/401, 408, 358/402–407, 409–412, 468, 442; 235/379, 380; 340/825.26, 825.27; 379/100; 380/18, 25; H04N 1/21

[56] References Cited

U.S. PATENT DOCUMENTS

| 5,230,048 | 7/1993 | Moy | 395/600 |
|---|---|---|---|
| 5,339,156 | 8/1994 | Ishii | 358/402 |
| 5,493,692 | 2/1996 | Theimer et al. | |
| 5,508,817 | 4/1996 | Kunigami | 358/402 |
| 5,530,739 | 6/1996 | Okada et al. | 358/402 |
| 5,559,721 | 9/1996 | Ishii | 358/402 |

OTHER PUBLICATIONS

NewsHound User Guide Internet E–Mail, Date Unknown.
Morgenstern, "Farcast Service Broadcasts Instant Info Via the Internet; Databases Use 'Droids' to Process News Items," PCWEEK, Aug. 29, 1994, vol. 11, No. 34, p. 50(1).

"Business Wire Via First!" by Individual, Inc., Mar. 01, 1995.

ED Krol,"The Whole Internet User's Guide & Catalog," 1994, pp. 101–148.

Brian Thomas, "Internet for Scientists & Engineers" 1995, pp. 57–70.

*Primary Examiner*—Kim Vu
*Attorney, Agent, or Firm*—Finnegan, Henderson, Farabow, Garrett & Dunner, L.L.P.

[57] ABSTRACT

An automated system of passively distributing personalized, unique information to users via electronic mail or facsimile. The system formats information into messages conforming to electronic mail protocols and transmits these messages to the user's electronic mailbox or reception system. The system also allows a user to automatically edit an underlying information database via electronic mail to modify services and further allows third parties to insert text messages into outbound message(s).

15 Claims, 7 Drawing Sheets

```
┌─────────────────────────────────────────────────────────────┐
│ 302 ┌ TO:   JOHN DOE                                        │
│     │ FROM:: CBELL@I-MAIL.COM                                │
│     └ RE:   CLOSING BELL@MONTH/DAY/YEAR                     │
│     -------------------------------------------------------- │
│ 304 ┌ CLOSING BELL FOR FEBRUARY 2, 1995                     │
│     └ MERRILL LYNCH, DAVID SMITH, (703) 555-1212            │
│                                                              │
│     ┌ AMGN   AMGEN.....................61 7/8   -     1/8   │
│     │ AMER   AMERICA ONLINE............56 1/2   +2    1/2   │
│     │ BGEN   BIOGEN....................36 3/4   +     3/8   │
│     │ BBTK   BROADBAND TECH............26 1/2   -     9/16  │
│     │ GNE    GENENTECH.................48 1/8   . . .       │
│     │ GIC    GENERAL INSTRUMENT........28 7/8   . . .       │
│     │ CEL    GROUPO IUSACELL...........14 7/8   -     1/8   │
│ 306 │ MOT    MOTOROLA..................60 5/8   -     1/8   │
│     │ CALL   NEXTEL....................10       . . .       │
│     │ ORCL   ORACLE....................42 7/8   +     1/2   │
│     │ PCTV   PEOPLE'S CHOICE TV........21 1/8   +     11/16 │
│     │ SYBS   SYBASE ...................44       +     5/8   │
│     └ TMX    TELEFONOS DE MEXICO.......33 1/2   -     3/4   │
│     -------------------------------------------------------- │
│ 308 ┌ TOTAL EQUITY VALUE              $75.328.11            │
│     └ TOTAL CASH BALANCE              $91,392.59            │
│     ============================================            │
│ 310 ┌ JOHN, PLEASE CALL ME. -DAVE S.                        │
└─────────────────────────────────────────────────────────────┘
```

300 — overall; 302 header; 304 subject; 306 stock list; 308 totals; 310 note

CUSTOMER DATABASE (INFORMATION ON CUSTOMER'S DESIRED SECURITIES.)

| | | | |
|---|---|---|---|
| FIELD 1-> | EMAIL | CHAR 100 | E-MAIL ADDRESS OF CUSTOMER |
| FIELD 2-> | DECIMAL | LOGICAL | DEFINE NON-INDEX SECURITY DISPLAY (FRACTION/DECIMAL) DEFAULT FALSE |
| FIELD 3-> | PRIORITY | NUM 1 | PRIORITY OF E-MAIL DISTRIBUTION |
| FIELD 4-> | CUST_REF | CHAR 25 | UNIQUE CUSTOMER NUMBER; INCLUDES CHARACTER TO INDICATE BROKERAGE FIRM |
| FIELD 5-> | CUST_ID | CHAR 10 | UNIQUE CUSTOMER NUMBER (INTERNAL TO IMAIL) |
| FIELD 6-> | CUST_NAME | CHAR 50 | CUSTOMR NAME |
| FIELD 7-> | CUST_ADD1 | CHAR 25 | CUSTOMER ADDRESS LINE 1 |
| FIELD 8-> | CUST_ADD2 | CHAR 25 | CUSTOMER ADDRESS LINE 2 |
| FIELD 9-> | CUST_CITY | CHAR 25 | CITY |
| FIELD 10-> | CUST_ST | CHAR 2 | STATE |
| FIELD 11-> | CUST_ZIP | CHAR 9 | ZIP |
| FIELD 12-> | CUST_CY | CHAR 20 | COUNTRY |
| FIELD 13-> | CUST_PHONE | NUM 10 | CUSTOMER PHONE |
| FIELD 14-> | GREETING | CHAR 35 | GREETING TO USE IN E-MAIL MESSAGE |
| FIELD 15-> | REC_OPEN | DATE | DATE RECORD CREATED |
| FIELD 16-> | REC_MOD | DATE | DATE RECORD LAST MODIFIED |
| FIELD 17-> | BROKER | CHAR 70 | BROKER NAME AND PHONE NUMBER (2ND LINE OF MESSAGE) |
| FIELD 18-> | EXPIRE | DATE | SUBSCRIPTION EXPIRATION (IF APPROPRIATE) |
| FIELD 19-> | RATE | NUM 5,2 | SUBSCRIPTION RATE (IF APPLICABLE) |
| FIELD 20-> | SUSPEND | DATE | SUSPEND DELIVERIES UNTIL THIS DATE |
| FIELD 21-> | RSA_TICK | CHAR 25 | PUBLIC ENCRYPTION KEY |
| FIELD 22-> | TRACK1 | CHAR 10 | CONTAINS SYMBOL OF SECURITY TO TRACK |
| FIELD 23-> | TRACK 2 | CHAR 10 | CONTAINS SYMBOL OF SECURITY TO TRACK |
| FIELD 24-> | TRACK 3 | CHAR 10 | CONTAINS SYMBOL OF SECURITY TO TRACK |
| FIELD 25-> | TRACK 4 | CHAR 10 | CONTAINS SYMBOL OF SECURITY TO TRACK |
| FIELD 26-> | TRACK 5 | CHAR 10 | CONTAINS SYMBOL OF SECURITY TO TRACK |
| FIELD 27-> | TRACK 6 | CHAR 10 | CONTAINS SYMBOL OF SECURITY TO TRACK |
| FIELD 28-> | TRACK 7 | CHAR 10 | CONTAINS SYMBOL OF SECURITY TO TRACK |
| FIELD 29-> | TRACK 8 | CHAR 10 | CONTAINS SYMBOL OF SECURITY TO TRACK |
| FIELD 30-> | TRACK 9 | CHAR 10 | CONTAINS SYMBOL OF SECURITY TO TRACK |
| FIELD 31-> | TRACK 10 | CHAR 10 | CONTAINS SYMBOL OF SECURITY TO TRACK |
| FIELD 32-> | TRACK 11 | CHAR 10 | CONTAINS SYMBOL OF SECURITY TO TRACK |
| FIELD 33-> | TRACK 12 | CHAR 10 | CONTAINS SYMBOL OF SECURITY TO TRACK |
| FIELD 34-> | TRACK 13 | CHAR 10 | CONTAINS SYMBOL OF SECURITY TO TRACK |
| FIELD 35-> | TRACK 14 | CHAR 10 | CONTAINS SYMBOL OF SECURITY TO TRACK |
| FIELD 36-> | TRACK 15 | CHAR 10 | CONTAINS SYMBOL OF SECURITY TO TRACK |
| FIELD 37-> | REC_MOD | DATE | DATE RECORD LAST MODIFIED |

SOURCE INFORMATION DATABASE (INFORMATION ON STOCKS, BONDS, MUTUAL FUNDS, INDEXES,[OPTIONS, CURRENCIES])

| FIELD 1-> | EXCHANGE | CHAR 1 | EXCHANGE WHERE SECURITY TRADED |
| FIELD 2-> | SYMBOL | CHAR 10 | TICKER OR REFERENCE SYMBOL FOR SECURITY |
| FIELD 3-> | CLOSE | NUM 10,4 | CLOSING PRICE FOR SYMBOL |
| FIELD 4-> | CHANGE | NUM 8,4 | CHANGE IN PRICE FOR SYMBOL FROM PRIOR TRADING DAY |
| FIELD 5-> | VOLUME | NUM 7 | VOLUME OF SHARES TRADED FOR SYMBOL |
| FIELD 6-> | HIGH | NUM 10,4 | HIGH PRICE FOR SYMBOL DURRING DAY |
| FIELD 7-> | LOW | NUM 10,4 | LOW PRICE FOR SYMBOL DURRING DAY |
| FIELD 8-> | OPEN | NUM 10,4 | OPENING PRICE FOR SYMBOL DURRING DAY |
| FIELD 9-> | HIGH52 | NUM 10,4 | 52 WEEK HIGH FOR SECURITY |
| FIELD 10-> | LOW52 | NUM 10,4 | 52 WEEK LOW FOR SECURITY |
| FIELD 11-> | SPLIT | LOGICAL | RECENT SHARE SPLIT |

206 ⟶

NAMES AND SYMBOLS DATABASE (REFERENCE DB ON SYMBOLS & SECURITY NAMES)

| FIELD 1-> | SYMBOL | CHAR 10 | TICKER OR REFERENCE SYMBOL FOR SECURITY |
| FIELD 2-> | SEC_NAME | CHAR 25 | SECURITY NAME OF SYMBOL |

*FIG. 4-2*

METHOD AND APPARATUS FOR DELIVERING AND MODIFYING INFORMATION ELECTRONICALLY

BACKGROUND OF THE INVENTION

Electronic mail ("e-mail") is to the 1990s what fax machines were to the 1980s—a must-have capability for any corporate employee or service professional. Additionally, consumers are increasingly adopting e-mail through on-line services. The Internet, for example, has linked disparate e-mail systems, creating a truly international distribution medium. It is estimated that over thirty million people have access to e-mail via the Internet today with an annual growth rate exceeding 100 percent.

Today, e-mail is used primarily as an interpersonal communication technology. Corporate users communicate with customers, vendors peers, subordinates, and superiors, while residential users are increasingly using e-mail to stay in touch with friends and relatives.

End-users generally do not use e-mail as an information services tool, however. As noted above, most e-mail is generated by one person and sent to another person. Very little of the worldwide e-mail volume is created by a computer. This is due in no small part to the challenges of creating automated processes for the generation and distribution of large volumes of unique e-mail messages.

In the past five years, several services have been created with the goal of using e-mail as an information services tool by creating a type of "personalized electronic newspaper." The services use computers (and proprietary software) to sift through news stories or press releases and select those articles/stories that match a predefined profile of a particular subscriber. Generally, the profile is based on particular industries or products; however, there may be options for somewhat more refined sifting criteria.

These services all have one thing in common—they manipulate publicly available information (AP wire service, Reuters, Business Wire, etc.) and match this information to a generic customer profile, not to a unique individual. The resulting "personalized newspaper" is sent via e-mail or facsimile to all subscribers that match the selected profile.

There are other companies that have started on-line services that allow end-users access to more personalized information, such as Compuserv, Prodigy, America-on-line, or World Wide Web home pages. These services allow end-users to get quotes on publicly traded securities and allow end-users to search databases for particular strings of text or subject matter. These services suffer from a common disadvantage, however, namely, they require the active involvement of the end-user in accessing the information. In other words, the end-user must dial up the service provider and request the information.

It is therefore desirable to provide an information delivery system and methods that substantially obviate one or more of the problems due to the limitations and disadvantages of the related art.

It is also an object of the present invention to provide a user with a low-cost system that allows the user to passively receive unique, customized, personal information via e-mail and/or facsimile machine.

It is another object of the present invention to provide a user with an e-mail processing system that allows the user to automatically edit user information by sending an e-mail to the processing system.

It is a further object of the present invention to provide one person with an e-mail processing system that allows that person to insert text messages into an e-mail message or facsimile message that is periodically sent by an automated processing system to another person.

Additional features and advantages of the invention will be set forth in the description which follows, and in part will be apparent from the description, or may be learned by practice of the invention. The objectives and other advantages of the invention will be realized and attained by means of the instrumentalities and combinations particularly pointed out in the written description and appended claims hereof as well as the appended drawings.

DESCRIPTION OF THE INVENTION

To achieve these and other advantages and in accordance with the purposes of the invention, as embodied and broadly described, the invention includes a system for providing information via electronic-mail ("e-mail"), comprising a source of information, a computer connected to the source of information, and an e-mail network connected to the computer, the computer including a customer database including a unique customer record for each customer, an information database including information dynamically updated periodically by the source of information, means for generating a file based on customer information in the customer database and based on the dynamically updated information from the information database, and means for converting the file to an e-mail message and transmitting the e-mail message to the customer via the e-mail network.

To achieve the advantages and in accordance with the purposes of the-invention, as embodied and broadly described, the invention also includes a method for providing information to a customer via e-mail, comprising the steps of, generating a customer record corresponding to a customer, storing the customer record in a database, generating a database of information to be provided to a customer, periodically updating the information in the information database, generating a file corresponding to the customer based on information in the customer record and the dynamically updated information, converting the file to an e-mail message, and transmitting the e-mail message to the customer via an e-mail network.

To achieve the advantages and in accordance with the purposes of the invention, as embodied and broadly described, the invention also includes a system for providing information via e-mail, comprising a source of information, a computer connected to the source of information, and an e-mail network connected to the computer, the computer including a customer database including a unique customer record for each customer, an information database including information dynamically updated periodically by the source of information, means for receiving e-mail messages from a predetermined customer, and means responsive to the e-mail messages from the predetermined customer for modifying a customer record corresponding to the predetermined customer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate presently preferred implementations of the invention and, together with the general description given above and the detailed description of the preferred implementations given below, serve to explain the principles of the invention.

In the drawings:

FIG. 3 is a preferred embodiment of an e-mail message format generated by the service processing system in accordance with one embodiment of the present invention;

FIG. 4 illustrates sample database structures in accordance with one embodiment of the present invention;

BEST MODE FOR CARRYING OUT THE INVENTION

Reference will now be made in detail to the construction and operation of preferred implementations of the present invention which are illustrated in the accompanying drawings. In those drawings, like elements and operations are designated with the same reference numbers where possible.

The following description of the preferred implementations of the present invention is only exemplary of the invention. The present invention is not limited to these implementations, but may be realized by other implementations.

Figure 1:
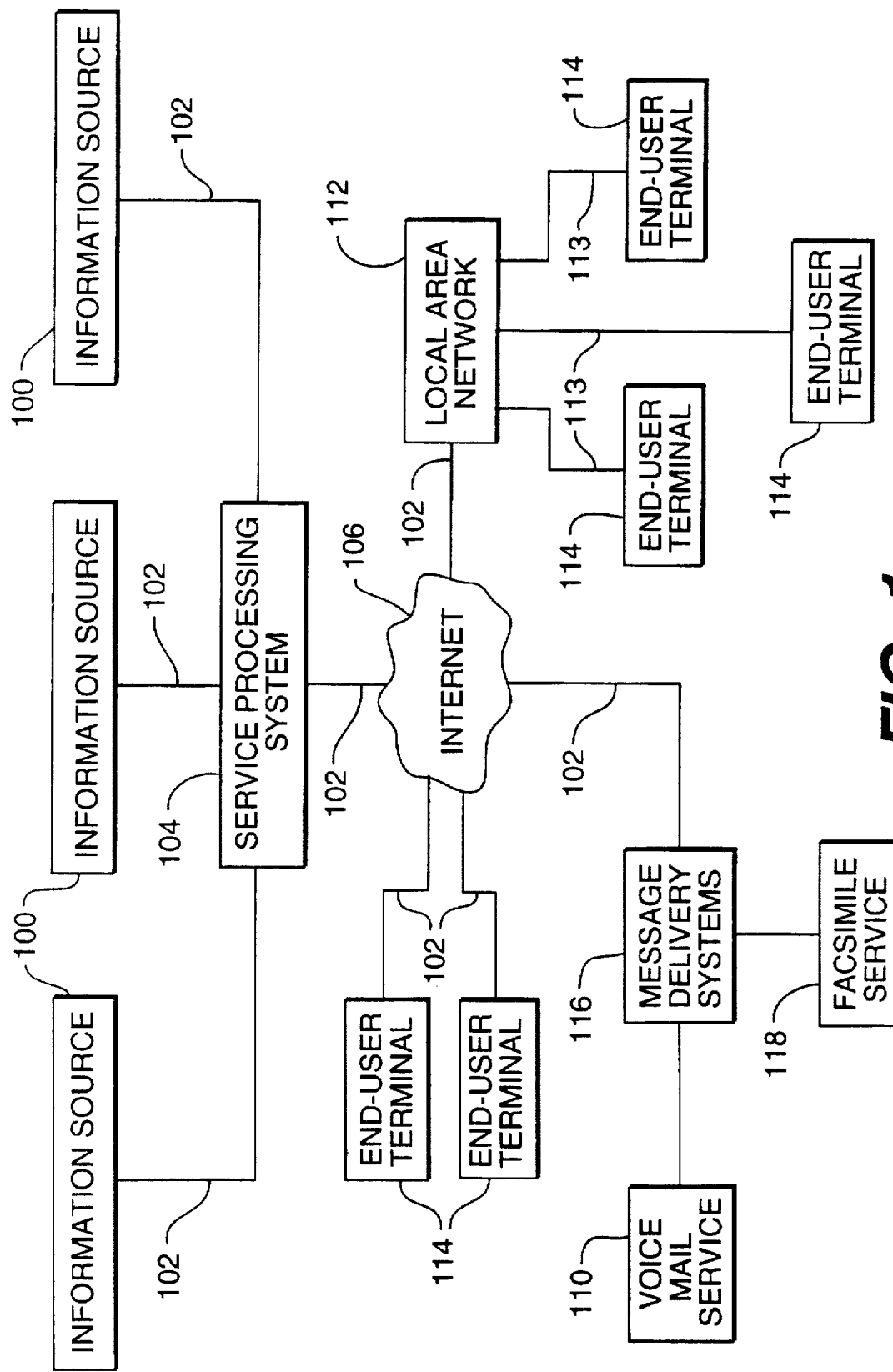
FIG. 1 is a block diagram of an information services system in accordance with one embodiment of the present invention.

FIG. 1 is a block diagram of an information services system in accordance with one embodiment of the present invention. In a preferred embodiment, the information provided by the system is securities information, such as stocks, bonds, mutual funds, etc. However, the invention contemplates information of all kinds, including, e.g. account balances, charges and payments, cleared checks, etc.

As shown in FIG. 1, one or more information sources 100 are connected to a service processing system 104 by connections 102. Connections 102 preferably include standard telephone line connections, but may include other conventional computer connections. Information sources 100 include any source of information such as the Associated Press, Reuters News, or The Wall Street Journal. Consistent with the preferred embodiment, one of the information sources 100 would obtain financial information from, e.g., a stock exchange.

Service processing system 104 connects via a connection 102 to the Internet 106 or some other e-mail network. End-user terminals 114 also connect to the Internet 106 via connections 102, and the service processing system 104 provides the information to the end-user terminals 114 through the Internet 106.

As discussed in more detail below, generally, service processing system 104 receives information from information sources 100, translates that information into database format, and stores the translated information in databases corresponding to services provided by the service processing system 104. Service processing system 104 then generates e-mail messages based on the contents of the databases and feeds those e-mail messages through the Internet 106 to end-user terminals 114.

As also shown in FIG. 1, e-mail messages can also be routed to end-user terminals 114 via a local area network ("LAN") 112. The LAN 112 is connected to the Internet 106 by a connection 102, and end-user terminals 114 are connected to the LAN via conventional LAN connections 113.

Alternatively, e-mail messages can be delivered to an end-user by voice-mail or facsimile message delivery systems. As shown in FIG. 1, a message delivery system 116 is connected to the Internet 106 via a connection 102. The message delivery system 116 may provide for voice-mail services 110 and/or facsimile services 118, in accordance with conventional techniques. As discussed in more detail below, if the service processing system 104 provides e-mail messages to a message delivery system 116, the service processing system 104 can first translate the e-mail messages into the appropriate voice-mail or facsimile format for delivery to the message delivery system 116. This translation is provided by text-to-voice processor 220 or facsimile processor 216, respectively. Alternatively, e-mail messages may be delivered to the message delivery system 116 as a conventional e-mail message, and the message delivery system 116 can translate the e-mail message into the appropriate voice-mail or facsimile message format.

Figure 2:
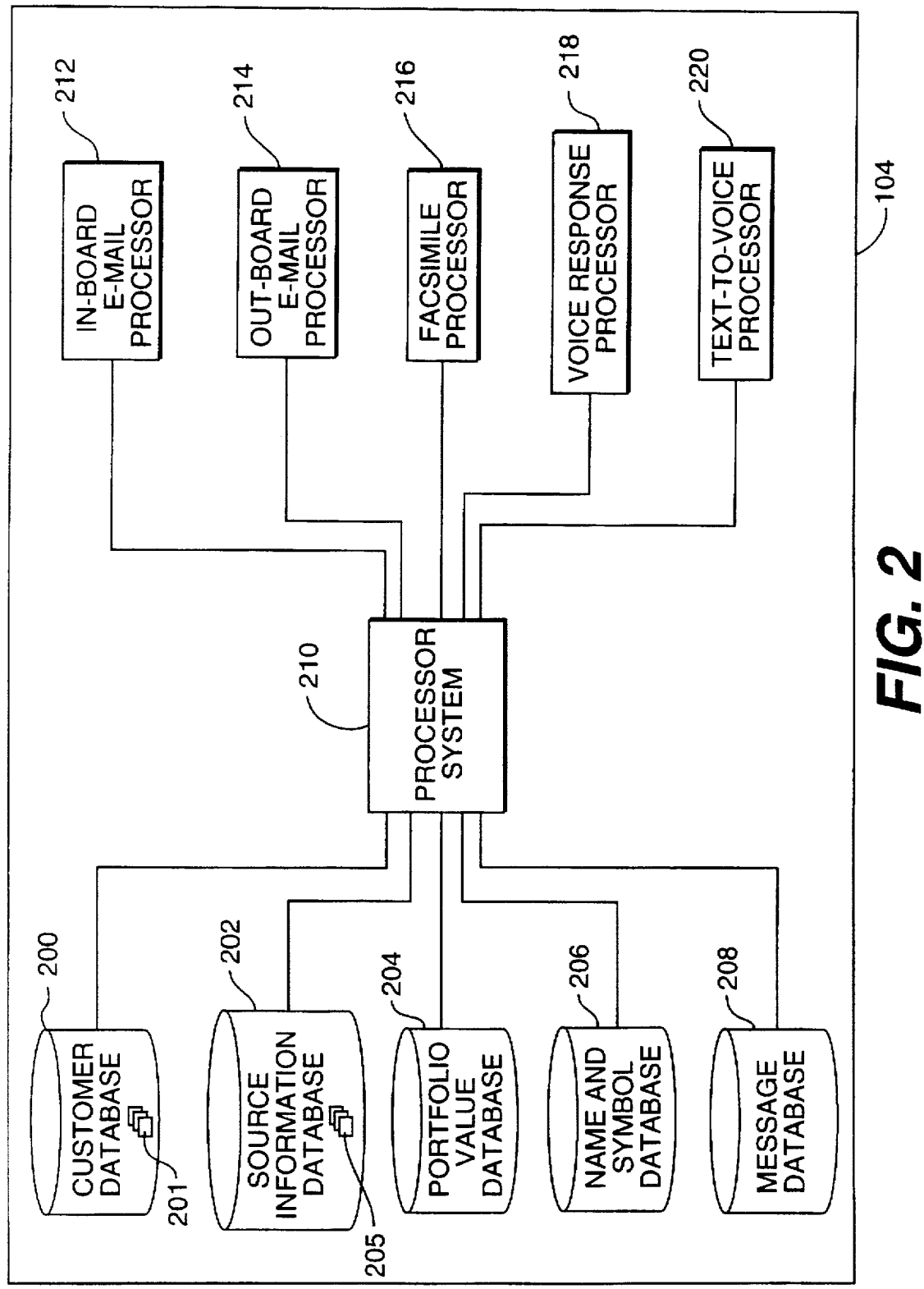
FIG. 2 is a block diagram of a service processing system in accordance with one embodiment of the present invention.

FIG. 2 is a block diagram of a service processing system 104 in accordance with one embodiment of the present invention. As shown, service processing system 104 preferably includes a plurality of databases, including a customer database 200, source information database 202, portfolio value database 204, name and symbol database 206, and message database 208. The contents of each database 200–208 is described in more detail below.

In addition, service processing system 104 includes an inbound e-mail processor 212, outbound e-mail processor 214, facsimile processor 216, voice response processor 218, and text-to-voice processor 220. The purposes and functions of each processor 212–220 will also be described in more detail below.

Each database 200–208 and each processor 212–220 is connected to a processor system 210. Generally, processor system 210 receives information from information sources 100 and stores that information in one of databases 200–208. As described in more detail below, at predetermined intervals, such as one per day, processing system 210 generates a temporary list or file of all information to be delivered via e-mails to end-users, then sends the file to either the outbound e-mail processor 214, facsimile processor 216, or text-to-voice processor 220, depending on the delivery path. These processors 214, 216, and 220, translate the file into e-mail format or message delivery format for the Internet 106, depending on whether the e-mails will be delivered via e-mail message delivery system 116.

Before describing the system operation for generating and transmitting e-mail messages, it is useful to consider an exemplary e-mail message format as displayed on an end-user terminal 114.

FIG. 3 shows an exemplary e-mail message 300 to be sent to end-user, John Doe. The exemplary e-mail message 300 includes a first information field 302 to identify the user, the source of the e-mail, the name of the e-mail service, and the date. The e-mail message 300 also includes a message field 304, which can include a text message as selected by the service provider. In the preferred embodiment where the invention provides stock quote information, field 306 lists selected companies (both exchange acronym and formal name), their stocks' present values, and the amount of gain or loss since a previous information period.

The preferred e-mail message 300 may also include information field 308 for providing customer portfolio balance information including total equity value and total cash balance for a customer's portfolio. Finally, an additional generic message field 310 may be included at the end of the message. As discussed in more detail below, messages for this field 310 can come from several sources, including third parties.

In accordance with the present invention, information for the various fields of 302–310 of the e-mail message 300 come from databases 200–208. Before describing the system processing operations for generating an e-mail message from the database information, the content of certain databases used to generate the exemplary e-mail 300 will be described.

FIG. 4 shows the database information for the customer database 200, source information database 202, and the name and symbol database 206. Specifically, in this preferred embodiment, customer database 200, for each customer subscribing to the service, includes a customer record 201 (FIG. 2), which lists thirty-seven fields relating to the service processor, the customer, and service. Column 4 of the listings in FIG. 4 provides a brief description of each field; hence, these descriptions need not be repeated here. With reference to fields 22–36, however, customer database 200 preferably provides for a list of fifteen securities, each field containing one security.

The names and symbols for the securities (see field 306 of FIG. 3) come from the names and symbols database 206 which, as shown in FIG. 4, includes the company's exchange symbol (field 1) and the formal name of the company associated with the symbol (field 2).

Customer database information for a customer record 201 is generated each time a new customer subscribes to an information service. The information to complete the fields may be gathered by an operator, over a direct connection 102 or, in response to a request from a potential customer, service processing system 104 may send a customer field template to the potential customer, who can complete certain field information and mail the information in via conventional mail or e-mail.

Referring still to FIG. 4, source information database 202 includes fields 1–11. These fields are dynamically updated at a predetermined interval (e.g. once per day) or in real-time by an information source 100. In the preferred stock quote embodiment, the information source 100 provides stock information at the close of a stock exchange business day. Column 4 of FIG. 4 provides a brief description of each field 1–11 in the source information database 202; hence, these descriptions need not be repeated here.

Figure 5:
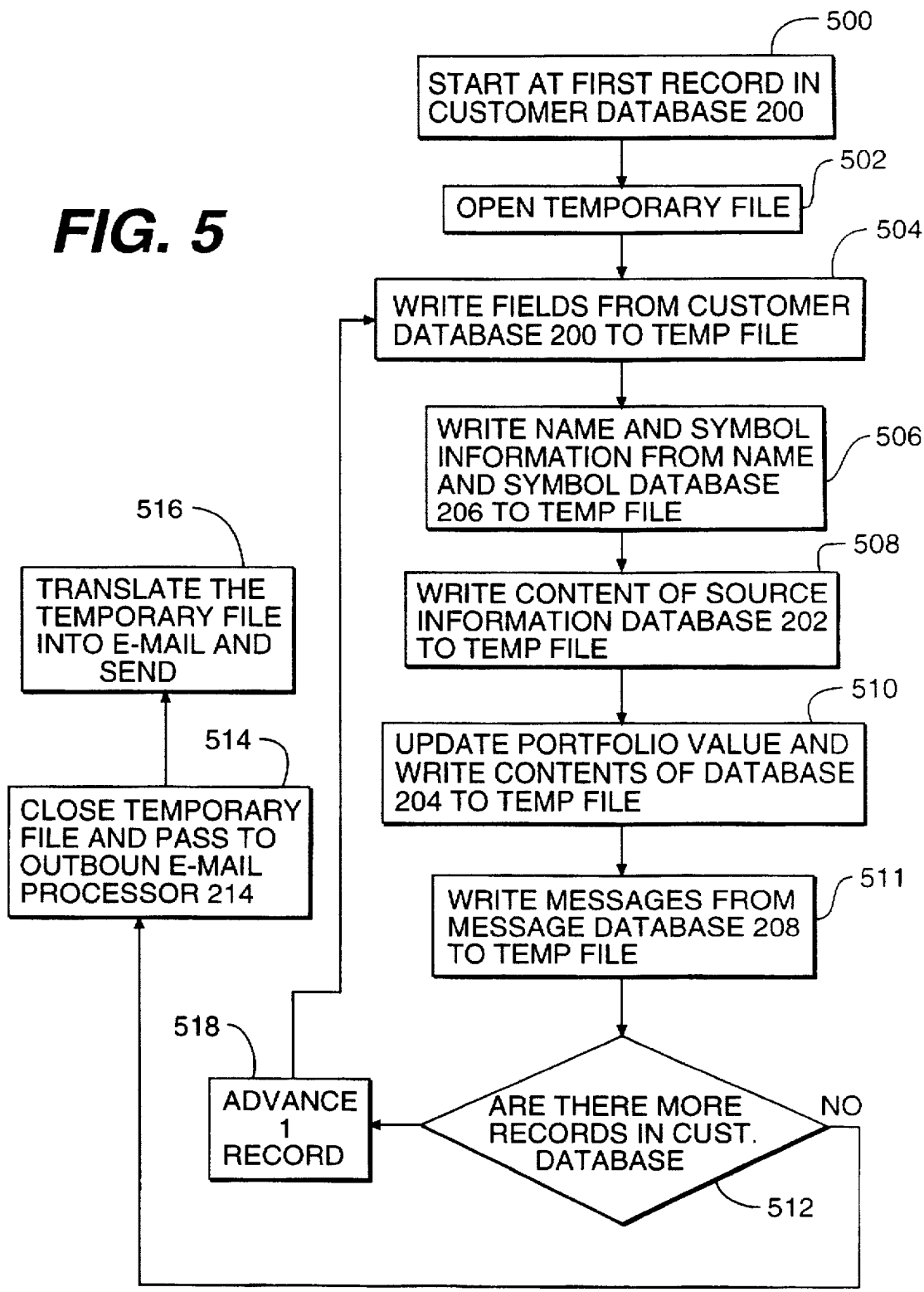
FIG. 5 is a processing flow diagram illustrating the processing operations of the service processing system to set up and automatically generate an e-mail message in accordance with one embodiment of the present invention.

FIG. 5 discloses the processing flow of the service processing system 104 for creating and distributing information e-mail for the preferred stock quote embodiment. The processing starts with the first customer record 201 in the customer database 200 (step 500). Initially, processor system 210 opens a temporary list or file (step 502). The temporary file will be filled in by the processor system 210 with the information from the various databases 200–208, depending on the service. For example, in the preferred embodiment stock quote service, the processor system 210 provides the contents of fields 1–37 of the customer record from the customer database 200 to the temporary file (step 504). Information from some of those fields will be used to complete fields 302 and 304 of the corresponding e-mail message 300 and to set up the information field 306 of the corresponding e-mail message 300.

Based on the company symbols in fields 22–36 of customer database 200, process system 210 goes to the name and symbol database 206 and writes to the temporary file the company name and symbol for the customer's selected securities (step 506). This information provides the name and symbol information for field 306 of the e-mail message 300. Process system 210 then writes the content of the source information database 202 to the temporary file for each security listed in the temporary file (step 508). This source information provides the stock values and changes as listed in field 306 of the e-mail message 300.

Next, process system 210 goes to the portfolio value database and inspects the portfolio value for a customer off a customer portfolio record 205. Preferably, using the information stored in the customer's portfolio record 205, the processor system 210 calculates new portfolio values based on the source information and updates the customer portfolio record 205. Alternatively, the customer portfolio records 205 can be updated by an information source 100 or other third party. Process system 210 then takes the portfolio values from the portfolio value database 204 and adds that information to the temporary file (step 510). This portfolio information provides the information for field 308 of the e-mail message 300.

Finally, processor system 210 looks to the message database 208 for any messages for the customer and writes these messages to the temporary file (step 511). These messages are used to fill message field 310 of the e-mail message 300.

In accordance with the present invention, a party can connect to the processor system 210 and leave a message for a customer. The message may be received as an e-mail, facsimile, or voice message, then processed into electronic storage form by one of inbound e-mail processor 212, facsimile processor 216, or voice response processor 218, in accordance with conventional techniques. The message is then stored in message database 208. For example, message database 208 may be edited by a broker who desires to send the message: "John, please call me.—Dave S." If the broker sends an e-mail to the inbound processor 212, with the appropriate key words, processor system 210 adds that message to the message database 208 for the customer. The key words may include words such as "message," which the processor system 210 recognizes and processes accordingly. The inbound message also includes a customer selector field to identify a customer or class of customers.

After completing the temporary file for a customer, processor system 210 determines whether there are more customer records 201 in the customer database 200 (step 512). If not, processor system 210 closes the temporary file and passes it to the outbound e-mail processor 214 (step 514). If, however, other customer records remain in the customer database 208, the system advances to the next record (step 518), and begins to process that customer record at step 504. Alternatively, processor system 210 may close each temporary file and pass it to the outbound e-mail processor 214 after completing the file for each customer.

The outbound e-mail processor 214 translates the temporary file into individual e-mail messages for each subscriber and sends the e-mail messages to an end-user terminal 114 through Internet 106 (step 516). The translation of the e-mail messages from the temporary file are performed in accordance with Internet transfer protocols.

In accordance with the present invention, a customer can also modify his/her services by modifying his/her customer record 201. As with input messages discussed above, a customer can modify a customer record via e-mail, facsimile, or voice-mail using the corresponding processors 212, 216, or 218.

Figure 6:
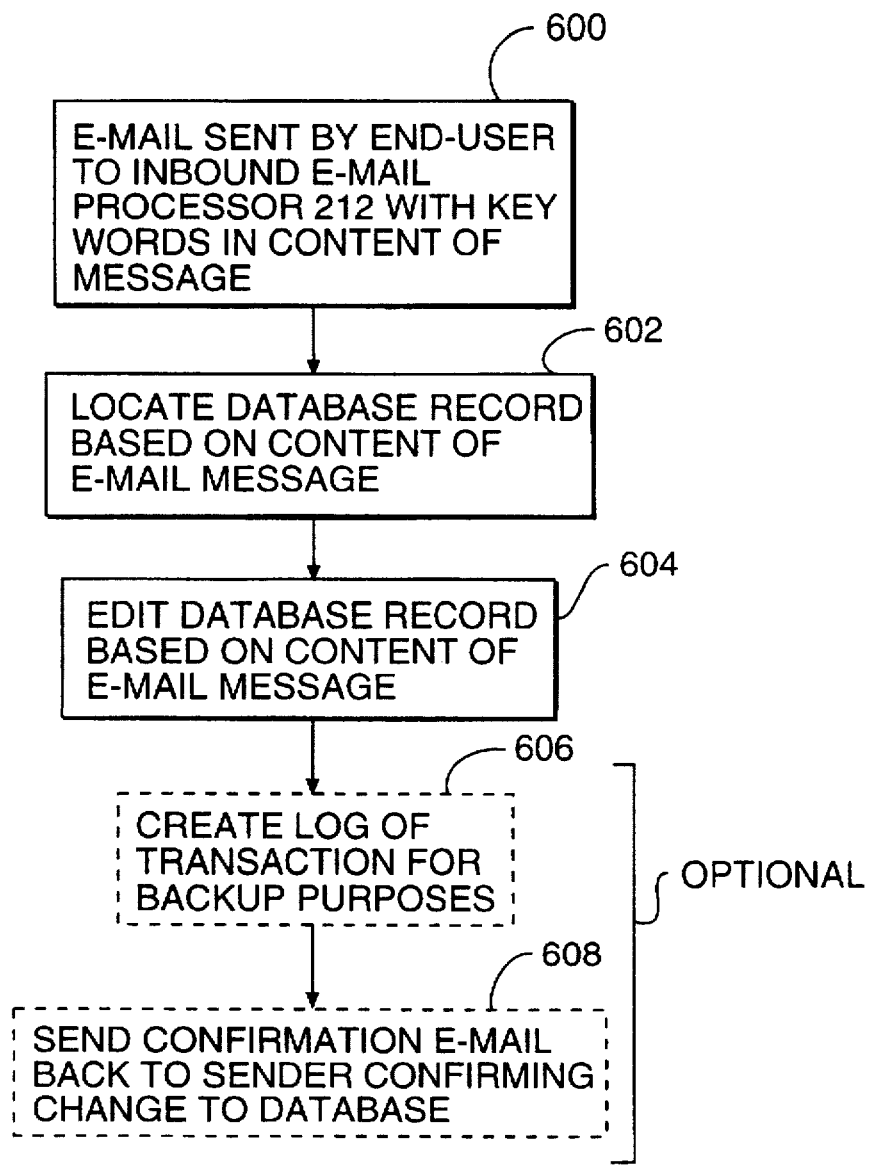
FIG. 6 is a processing flow diagram operation of the service processing system to modify a database based on inbound information in accordance with one embodiment of the present invention.

FIG. 6 illustrates a processing flow diagram for providing this modification via an e-mail message. Initially, an e-mail message is received by the inbound e-mail processor 212, translated, and passed to processor system 210 (step 600). Based on key words in the content of the message, processor system 210 learns that it should modify one or more customer records and locates the customer's database record(s) 201 (step 602). For example, the inbound e-mail message may include a field that says "edit" or "modify," which processor system 210 recognizes as an instruction to edit or modify one or more customer records. Processor system 210 then looks to another field of the e-mail message that identifies one or more customer's name or number. After locating the customer record(s), processor system 210 then edits the database record based on the content of the e-mail message (step 604). Processor system 210 can, optionally, create a log of the transaction for backup purposes (step 606), then generate an e-mail to send back to the customer concerning the edits to the database (step 608).

In accordance with the present invention, processor system 210 comprises a personal computer or a larger workstation. Databases 200–208 preferably comprise relational database software, e.g. Oracle or Sybase. Also, processors 212–220 may comprise a separate computer from processor system 210 or may be the same computer as processor system 210.

While there has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

I claim:

1. A system for providing information via electronic-mail ("e-mail") to customers, comprising:
   a source of information;
   a computer connected to said source of information; and
   an e-mail network connecting said computer to said customers, said computer including:
      a customer database including a unique customer record for each customer;
      an information database including information dynamically updated periodically by said source of information;
      means for generating a file based on customer information in said customer database and based on said dynamically updated information from said information database; and
      means for converting said file to an e-mail message and transmitting said e-mail message to said customer via said e-mail network;
      wherein the customer information includes at least a portion of the unique customer record and the means for generating further includes means for matching a field in the unique customer record to a corresponding field in said information database.

2. The system of claim 1, wherein said information includes at least one of securities information, cleared checks, account balances, and charges and payments.

3. The system of claim 1, wherein said information database includes a list of publicly traded securities, which is updated daily by said information source.

4. A system according to claim 1, said computer further comprising:
   means for receiving e-mail messages from a predetermined customer; and
   means responsive to said e-mail messages from said predetermined customer for modifying said unique customer record corresponding to said predetermined customer.

5. A system according to claim 4, wherein said means for modifying includes means for modifying a list of securities.

6. A system according to claim 1, further comprising a message database, wherein said computer further includes:
   means for receiving message information from a party;
   means for storing said message information in said message database; and
   means for adding said message information to said file before said file is converted to an e-mail message.

7. A method for providing information to a customer via e-mail, comprising the steps of:
   generating a customer record corresponding to said customer;
   storing said customer record in a database;
   generating a database of information to be provided to a customer;
   periodically updating said information in said information database;
   generating a file corresponding to said customer by matching fields in the customer record to predetermined corresponding fields in the information database;
   converting said file to an e-mail message; and
   transmitting said e-mail message to said customer via an e-mail network.

8. The method according to claim 7, wherein said information includes at least one of securities information, cleared checks, account balances, and charges and payments.

9. The method according to claim 7, wherein said information database includes a list of publicly traded securities, which is dynamically updated daily by an information source.

10. The method according to claim 7, further comprising the steps of:
    receiving an e-mail message from said customer; and
    modifying said customer record corresponding to said customer in response to said e-mail message from said customer.

11. The method according to claim 10, wherein the step of modifying includes the steps of modifying a list of securities.

12. The method according to claim 7, further comprising the steps of receiving message information from a party, storing said message information in a message database, and adding said message information to said e-mail message before transmitting said e-mail message.

13. The method according to claim 7, further comprising the steps of receiving message information from a party, storing said message information in a message database, and adding said message information to a plurality of e-mail messages before transmitting said plurality of e-mail messages.

14. A system for providing information via electronic-mail ("e-mail") to customers, comprising:

a computer connected to receive securities information, the securities information including information identifying selected securities and corresponding prices of the selected securities;

a customer database including unique records for each customer, the unique customer records including a plurality of fields, at least one of the plurality of fields containing information identifying a security preselected by the customer; and an information database for storing the securities information received by the computer, the information database being periodically updated with said securities information; wherein the computer includes means for generating an e-mail message by matching the fields containing the security identification information from one of the unique customer records with the securities identifying information received by the computer and stored in the information database.

15. A method for providing information to a customer via e-mail, comprising the steps of:

generating a customer record corresponding to said customer, the customer record including at least one field identifying a security preselected by the customer;

storing said customer record;

storing information identifying securities and corresponding prices of the securities;

periodically updating the security information;

generating a file corresponding to said customer by matching the information identifying securities to the at least one field identifying the security preselected by the customer;

converting said file to an e-mail message; and transmitting said e-mail message to said customer via an e-mail network.

* * * * *